Oct. 3, 1961  F. W. KULICKE, JR., ET AL  3,003,051
WELDING APPARATUS
Filed July 29, 1959  2 Sheets-Sheet 1
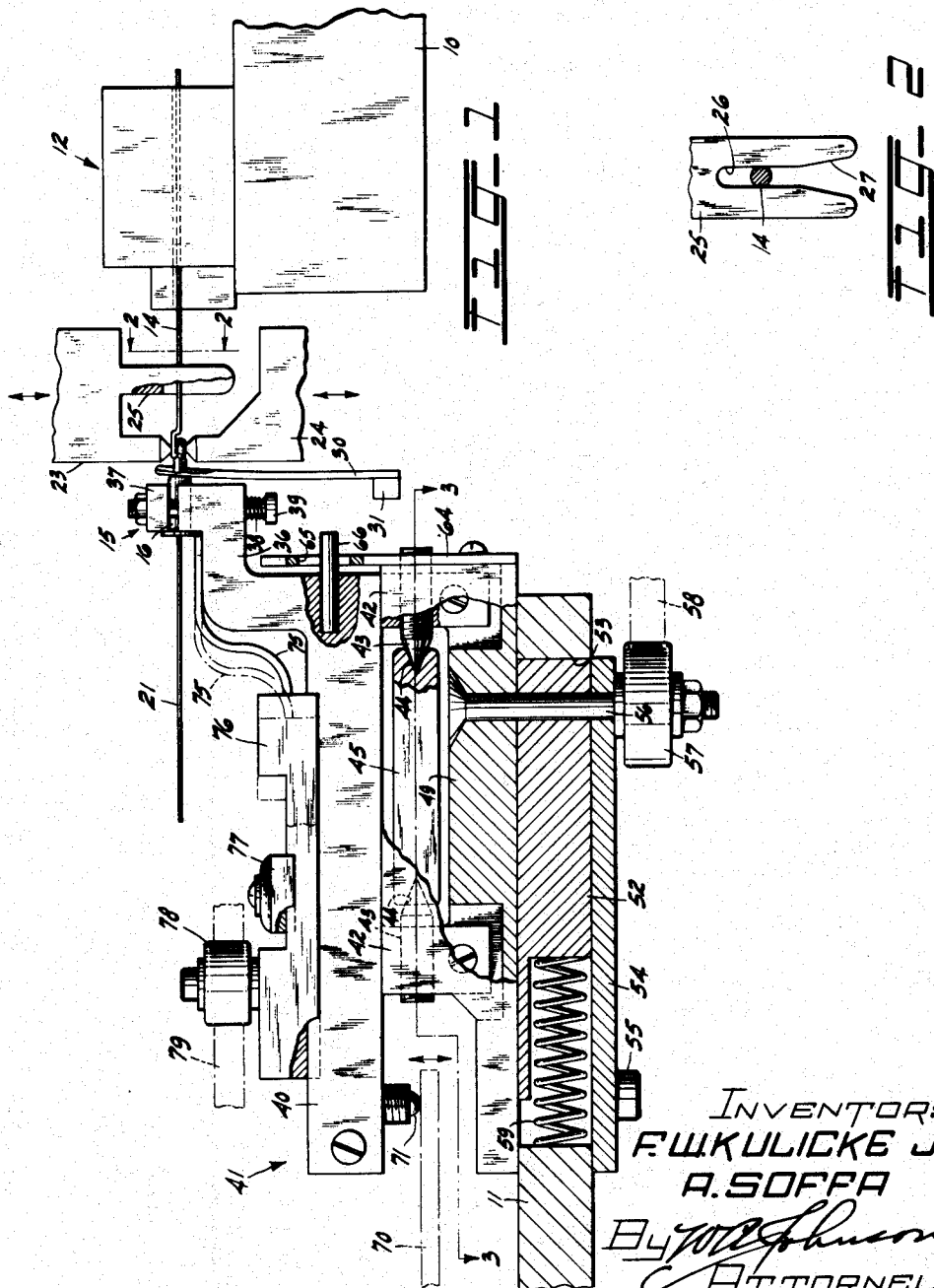
INVENTORS
F. W. KULICKE JR.
A. SOFFA
By
ATTORNEY

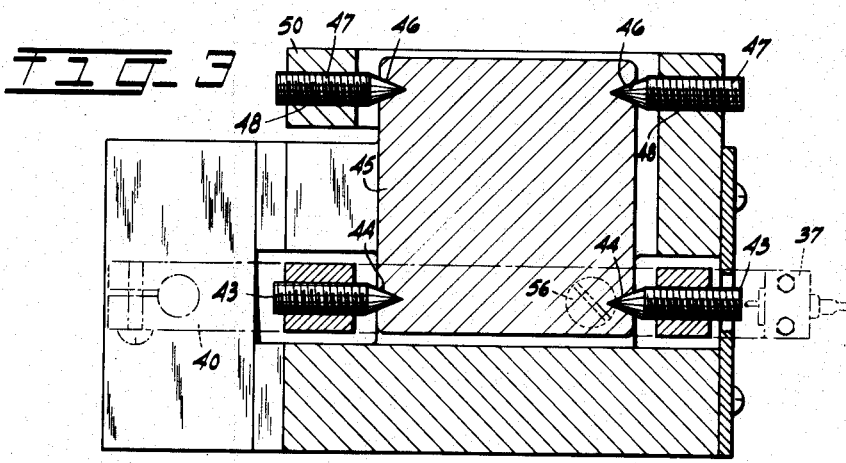
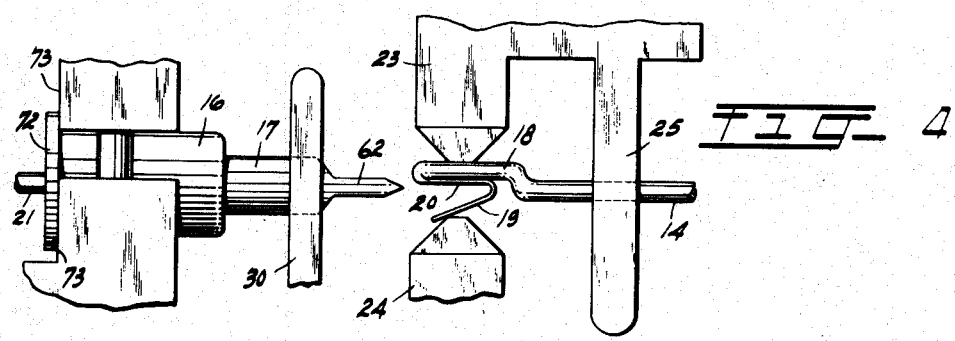
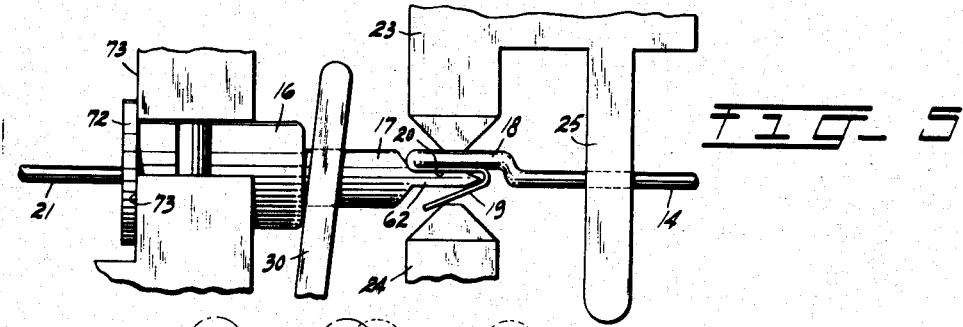
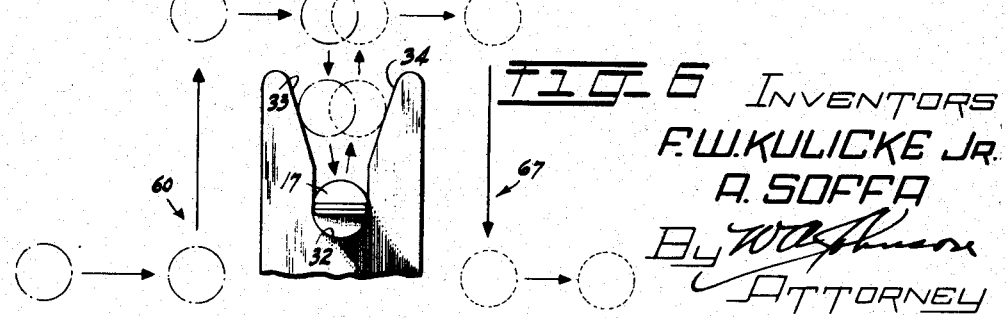

:::
United States Patent Office 3,003,051
Patented Oct. 3, 1961

---

3,003,051
WELDING APPARATUS
Frederick W. Kulicke, Jr., and Albert Soffa, Philadelphia, Pa., assignors to Western Electric Company, Incorporated, New York, N.Y., a corporation of New York
Filed July 29, 1959, Ser. No. 830,296
9 Claims. (Cl. 219—78)

This invention relates to apparatus for joining parts to articles, particularly apparatus for joining wires to sealed tubulations of articles.

In the manufacture of certain types of electrical components such as diodes, the main article or diode includes a housing for the inner structure with a lead fixed to one end of the housing and a metal tubulation fixed to the other end for use in exhausting air from the housing. Another lead must be provided for the article and in this instance, the second lead must be secured to the sealed end of the tubulation. As disclosed in F. W. Kulicke, Jr.'s copending application, Serial No. 830,408, filed July 29, 1959, the tubulation for each article is shortened, provided with a new sealed end through a pinching-off process and flattened to be received in a pocket formed by a flattened end of the lead wire which is to be secured to the tubulation. In actual structure, the article with the sealed end of the tubulation and the wire with its pocket are quite small, presenting a problem of positioning both the article and the wire at the joining station relative to each other, of inserting the flattened sealed end of the tubulation in the pocket and forming a fixed joint of this structure.

The object of the present invention is the solution to this problem embodied in an apparatus which is highly efficient in joining parts to articles.

In accordance with the object, the invention comprises a structure in an apparatus for joining parts moved successively to a joining station, to articles having projections, moved successively to the joining station. In this structure, there is a holder for each part and a holder for each article with means disposed at the joining station to cause alignment of the part and the projection of the article and other means actuable to cause engagement of the part and the projection of the article at which time they are secured together.

More specifically, the part is in the form of a wire having a flattened end formed into a pocket capable of enclosing the sealed end of a tubulation of an article. A locating element, which in the present instance is resilient, is disposed at a given position at the locating station and provided with a recess in its upper end to receive the tubulation of the article, when a carriage supporting the article holder is expanded to move over the element and contracted to lower the tubulation in the recess. The element also retains its support of the article and the tubulation while the sealed end of the tubulation is moved into the pocket of the wire. Also, electrodes for joining the tubulation and the wire serve to align the pocket with the sealed end of the tubulation.

Other objects and advantages will be apparent from the following detailed description when considered in conjunction with the accompanying drawings wherein:

FIG. 1 is a fragmentary vertical sectional view of the apparatus at the joining station;

FIG. 2 is an enlarged fragmentary side elevational view taken along the line 2—2 of FIG. 1;

FIG. 3 is a horizontal sectional view taken along the line 3—3 of FIG. 1;

FIG. 4 is a fragmentary detailed view of the structure surrounding the joining of the part and article during the alignment period;

FIG. 5 is a view of the structure shown in FIG. 4 at the end of the assembling action; and FIG. 6 is a schematic illustration of the movements of the tubulation of each article into and out of the aligning element.

In the present embodiment of the invention, which is a part of the apparatus disclosed in the aforementioned co-pending application, there are two turrets 10 and 11 having respectively eight holders 12 for parts such as wires 14 and eight holders 15 for articles 16. The turrets 10 and 11 are moved intermittently between intervals of rest through processing stations so that during each intermittent motion of the turrets, a holder 12 will position a wire 14 of the contour shown in FIGS. 1, 4, and 5 to be joined with a tubulation 17 of an article 16 which has been moved into the joining station by a holder 15 of the turret 11.

The wire 14, in each instance, is provided with an offset portion 18 and a flattened end 19 formed into a pocket 20 so that when the pocket is closed (FIG. 1), on the sealed end of the tubulation, the main portion of the lead wire 14 will be in the central alignment with the tubulation 17, the housing of the article 16 and the lead 21 fixed thereto.

Companion members 23 and 24, which in the present instance are welding electrodes, are spaced normally away from each other to permit movement of the wire into the joining station. One of the members 23 has a projection 25 bifurcated, as shown in FIG. 2, to provide a locating groove 26 with a widened entrance end 27 to straddle the wire 14 and move it laterally, if need be, to swing the pocket 20, into the desired lateral location. Furthermore, the members 23 and 24 will have two moving actions to locate the pocket 20 through any vertical action that need be taken to bring it into exact alignment with the sealed end of the tubulation of the article.

A locating element 30 is of a resilient nature formed, for example, of spring steel with its lower end fixed to a support 31 and its upper end provided with a recess 32 and outwardly extending walls 33 and 34 of the recess. The recess 32 is of a size to receive and to locate accurately the tubulation 17 as shown in FIGS. 4, 5, and 6.

The article holder 15 has a supporting portion 36 grooved to receive the article 16 and provided with a member 37 normally held downwardly by spring means 38. A plunger 39 movably disposed in an aperture of the supporting portion 36 has the spring 38 disposed concentric therewith and the upper end connected to the member 37 to removably hold the article in place to grip the article. The supporting portion 36 is integral with a top member 40 of a carriage indicated generally at 41. The top member 40 has downwardly extending legs 42 with aligned threaded apertures for receiving adjustable cone centers 43, the inner ends of which are receivable in conical recesses 44 of an intermediate member 45. The intermediate member 45, FIGS. 1 and 3, has conical recesses 46 disposed in alignment for receiving threaded cone centers 47 disposed in threaded apertures 48 of a lower member 49. The lower member 49 of the carriage has upwardly projecting portions 50 for receiving the threaded apertures 48 and for supporting the cone centers 47. The lower portion 49 has a slide member 52 disposed in a groove or elongated aperture 53 of the turret 11 where it is partially covered by the lower member 49 and held in place by a companion member 54 secured at 55 to the member 49.

A spindle 56 connecting the member 49 with its slide member 52 and the cover member 54 supports a cam follower or roller 57 positioned to be engaged by a cam 58. This structure, associated with the article holder 15 in FIG. 1, is identical with all of the structures at the eight positions about the turret 11. The function of the cam 58, adjacent the joining station, is to hold the carriage at a position to the left against the force of a spring 59 applied to the slide 52 until the tubulation 17 of the article is moved through the approaching path indicated generally at 60, FIG. 6, and has entered the recess 32 of the resilient element 30, after which the cam 58 in acting on its follower 57 permits the force of the spring 59 to move the carriage with the holder, to move the flattened sealed end 62 of the article into the pocket 20 of the wire 14.

A guide plate 64 mounted on the lower member 49 has a vertically extending aperture 65 therein to receive a guide pin 66 carried by the upper member 40 to maintain a desired vertical position of the holder 15 with the article therein during its movement into and out of the recess 32. The action of the carriage which may be defined as the expanding and contracting actions thereof are illustrated somewhat in FIG. 6 including the approaching action 60 and the action 67 of the tubulation of the article leaving the recess of the element 30 and continuing onto the next station.

The horizontal movements of the actions 60 and 67 are parts of the intermittent motions of the turret 11 while the vertical actions are brought about through an elevating member 70 positioned to engage an adjustable member 71 of the upper member 40 of the carriage when in the area of the joining station. The member 70 is raised and lowered as indicated by the double-headed arrow by suitable means, not shown, to expand the carriage as it approaches the joining station, allow the carriage to contract to permit the tubulation 17 of each article to rest in the recess 32 and prior to the next intermittent motion of the turret, to cause the carriage to expand and to subsequently contract after the article has moved beyond the element 30.

During the previous forming of the flattened end 62 of the tubulation and the pinching-off of an excess length from the tubulation, the article is caused to move to the left in its holder as the result of the extruding action or the disturbance of the material of the tubulation during the flattening and the pinching-off process. It is important, therefore, that each article be returned to its proper position in the holder with the cover member 72 of the housing of the article resting against a reference surface 73 of the holder. This resetting of the article is brought about by a finger 75 carried by one end of a slide 76 mounted on the upper member 40 normally retained against movement by a friction member 77 carried by the top member 40 and having a cam follower 78 mounted thereon to be engaged by a grooved cam 79 adapted to move the finger 75 from the broken line position to the solid line position to return the article to the preferred position in the holder to condition it to be mounted or joined to the wire 14.

Operation

Although only the mechanism surrounding the joining station of the apparatus has been shown, it should be understood that during successive intervals, part or wire holders 12 are moved into the joining station at the same time article holders 15 are brought into that station. Furthermore, in the joining station, operations are performed simultaneously regarding the wire and article to assure alignment of the portions to be assembled by accurately positioning these portions before they are brought into assembly.

With the part 14 or wire, it should be understood that the illustration thereof in the drawings is greatly enlarged, particularly in FIGS. 4 and 5, and for this reason as soon as the wire in each instance is located at the joining station, the elements 23 and 24 move toward each other, but before they engage their particular portions of the wire, the bifurcated member 25 straddles the wire and brings about a lateral movement of the end thereof, if need be, to position the end carrying the pocket 20 between the members 23 and 24.

During partial closing of these members, 23 and 24, they function jointly to bring about vertical adjustment of the pocket to the position desired for receiving the flattened end 62 of the tubulation 17 of the article. During these positioning movements applied to the wire, other positioning movements are brought about first through the actuation of cam 79 to move the article against the holder 15 to cause the shoulder or cover 72 to engage the reference surfaces 73, after which the actuator 70 causes expansion of the carriage 41 to move the article holder 15 upwardly so that when, in general alignment with the recess 32, the actuator will allow the carriage to contract to position the tubulation 17 at rest in the recess.

At this time, cam 58 actuates to permit the carriage to be moved laterally relative to the element 30 and assure accurate positioning of the flattened sealed end of the article in the pocket 20. During this lateral movement of the carriage, the element 30 may be flexed to continue its guiding support of the article.

At this time, the final movements of the elements or electrodes 23 and 24 close firmly to thereby close the pocket 20 on the flattened end 62 and, by completion of a welding circuit (not shown) through the electrodes, the joint may be completed between both flattened portions of the wire forming the pocket, the flattened end of the tubulation and the adjacent off-set portion 18 of the wire. After this has been accomplished, the electrodes will be moved into open position, the wire 14 will be freed from its holder 12 by suitable means, not shown, and the actuator 70 will move through its actions again to expand the carriage and subsequently allow it to contract as indicated at 67 to permit the work holder carrying the article and the joined wire to move out of the joining station.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for joining parts moved successively to a joining station, to articles having projections moved successively in a given path toward the joining station, a holder for each part, a holder for each article, supports for the holders movable laterally relative to the joining station respectively to locate the parts successively in the joining station and to locate the articles successively adjacent the joining station, a locating element mounted at a fixed position in the joining station transversely of the given path of the projections and having a recess in the upper end thereof to receive the projections singly and position them with respect to their parts, a carriage for each article holder mounted for movement on its support and having operatively connected relatively movable members adapting the carriage for vertical expansion and contraction to raise and lower their holders, and an actuator for each carriage movable relative to the support for the articles to cause expansion of the carriage in advance of the joining station to move the projection out of said path and above the locating element and to cause contraction of the carriage at the joining station to lower the projection until it comes to rest in the recess of the locating element.

2. An apparatus according to claim 1 in which a force applying unit urges the carriage relative to the support to move the projection of the article toward the part, and a cam operable at the joining station to control the force applying unit to move the carriage a predetermined distance toward the part.

3. An apparatus according to claim 1 in which each article holder frictionally holds its article therein short of its extreme outward movement, a push rod movably supported by each carriage and normally held away from the article holder thereof, and means actuable to move each push rod at the joining station a given distance relative to its article holder to engage the article and force it to move in its holder to locate the projection thereof in engagement with its part.

4. An apparatus according to claim 3 in which a portion of the locating element is resilient so that it may be flexed toward the part by the article during movement of the article to locate the projection in engagement with the part.

5. An apparatus according to claim 1 in which joining members are operable at the joining station to secure the part to the projection of the article, the actuator being further actuable to cause expansion of the carriage to move the projection with its joined part out of the recess and cause contraction of the carriage when moved out of the joining station.

6. An apparatus according to claim 5 in which a guide supported by one of the members of the carriage controls movement of the article holder in a given vertical path during expansion and contraction of the carriage.

7. In an apparatus for joining wires, having pockets formed in outer ends thereof, to articles having tubulations with sealed ends, at a joining station, a holder for each wire adapted to grip its wire short of its pocket, a holder for each article, separate supports for the wire holders and the article holders movable relative to each other to move the holders with their wires and articles into the joining station, means actuable at the joining station to flex the wire extending from the wire holder therein to locate its pocket in a receiving position, a locating element mounted at a fixed position in the joining station and having a recess in its upper end disposed in alignment with the receiving position, an expansible and contractable carriage for each article holder mounted on the support therefor, an actuator movable to cause expansion of each carriage in advance of the joining station to position the tubulation of the article above the locating element and to cause contraction of the carriage to allow the tubulation to rest in the recess of the element and be aligned thereby with the pocket of the wire, and means to move the carriage to move the sealed end of the article into the pocket of the wire while being guided by the locating element.

8. An apparatus according to claim 7 in which joining members are disposed at the joining station upon opposite sides of the pocket and moved into engagement with the pocket to close the pocket on the sealed end of the tubulation and secure the sealed end of the tubulation in the pocket.

9. An apparatus according to claim 8 in which the actuator is further movable to cause expansion of the carriage to move the article with its joined wire free of the recess of the locating element and cause contraction of the carriage when moved out of the joining station.

References Cited in the file of this patent

UNITED STATES PATENTS

| | | |
|---|---|---|
| 2,749,419 | Larson | June 5, 1956 |
| 2,807,707 | Birchler et al. | Sept. 24, 1957 |
| 2,901,589 | Spillar | Aug. 25, 1959 |
| 2,936,361 | Shappell | May 10, 1960 |